NARROW BAND EMITTER DEVICES

Filed May 3, 1963 2 Sheets-Sheet 1

INVENTOR.
FREDERICK W. SCHMIDLIN

BY Fraser and Bogucki

ATTORNEY

NARROW BAND EMITTER DEVICES

Filed May 3, 1963 2 Sheets-Sheet 2

INVENTOR.
FREDERICK W. SCHMIDLIN
BY Fraser and Bogucki
ATTORNEY

United States Patent Office 3,310,685
Patented Mar. 21, 1967

3,310,685

NARROW BAND EMITTER DEVICES

Frederick W. Schmidlin, Portuguese Bend, Calif., assignor, by mesne assignments, to GTC Corporation, a corporation of Texas Filed May 3, 1963, Ser. No. 277,891
19 Claims. (Cl. 307—88.5)

This invention generally relates to solid state electrical devices exhibiting tunnel emission characteristics, and more specifically to a structure in which electron "tunneling" is effected through a thin film dielectric located intermediate selected conductive and semiconductive materials.

"Tunneling" is a term used to describe the phenomenon wherein an electron at a given energy level, and located on one side of a potential energy barrier, is capable of appearing on the other side of the barrier at the same level of energy. Various devices have been constructed using this phenomenon to advantage, including a device now known as a tunnel diode which exhibits the characteristics of negative resistance. The tunnel diode comprises a three layer structure: first, a material on one side of the barrier having an occupied allowed energy level for an electron, that is, an energy level capable of defining a source of electrons; second, an energy barrier material sufficiently thin to permit tunneling of electrons to occur; and third, a material having allowed energy levels on the other side of the barrier which are empty so as to receive electrons after tunneling has occurred. One such negative resistance device has been described by L. Esaki in an article entitled, "New Phenomenon in Narrow Germanium p–n Junctions," published in The Physical Review, vol. 109, p. 603, 1958.

Presently, attempts have been made to use the phenomenon for the production of "tunnel-emission" devices. The general theory in the operation of such devices has been described by C. A. Mead in an article entitled "Operation of Tunnel-Emission Devices," published in the Journal of Applied Physics, vol. 32, p. 646, April 1961. Such tunnel-emission devices presently include those now known as the "tunnel-emission cathode" and the "tunnel-emission amplifier," the "amplifier" including the "cathode" as one of its elements.

Generally, unlike tunnel diode devices which have a material on the other side of the barrier to capture the tunneled electrons, tunnel-emission devices are constructed so that the tunneled electrons pass through a material called the base on the other side of the barrier to emerge as free electrons. There are three basic conditions necessary for this tunnel-emission phenomenon: first, the energy barrier should be sufficiently thin to enable appreciable tunneling of electrons therethrough; second, a filled energy level must exist on one side of the barrier to serve as a source of electrons; third, the tunneled electrons must emerge into allowed energy states in the material on the other side at a sufficiently high level of energy to overcome the work function of the base material. Presently accepted terminology refers to the material defining the source of electrons as the "emitter," and the thin material on the other side of the barrier as the "base." Thus, electrons may be said to emerge from the filled energy levels in the emitter, tunnel through the barrier, traverse the base and emerge from the outer surface of the base into vacuum or some other material which may be present. This operation is analogous to the emission of electrons from the cathode of a vacuum tube.

The tunnel-emission amplifier utilizes the principles of a tunnel-emission cathode in combination with two additional material layers to provide the amplifier operation.

A first additional layer composed of an intrinsic semiconductor or an insulator is applied to the surface of the base opposite the barrier. This additional layer blocks the emission of low energy electrons from the base and provides a channel for the higher energy electrons emitted from the cathode structure to be transported to the second additional layer. This first additional layer might be called the "sluice" because of the similarity of its function to that of a gold miner's sluice. The final or second additional layer is simply a metal contact for collecting the electrons transported through the sluice and may be termed the "collector."

As with the tunnel-emission cathode, a forward bias potential is maintained between the emitter and the base of the tunnel-emission amplifier to produce tunnel emissions. In addition, another forward bias voltage is applied between the collector and the base to produce a favorable potential slope in the sluice so that any electrons emitted from the base which successfully surmount the potential barrier in the first part of the sluice will pass through the remainder of the sluice into the collector. Voltage amplification is possible because the collector-to-base voltage can be much higher than the emitter-to-base voltage. A strong analogy to the operation of a vacuum tube is suggested by the shape of the potential variation in the sluice, the principal difference being that the number of electrons available with sufficient energy to surmount the barrier is controlled by raising or lowering the energy of the electrons instead of (as in the vacuum tube) raising or lowering the height of the barrier.

Unfortunately, various physical and manufacturing limitations incurred in the production of tunnel-emission devices have previously limited useful application of such potentially important devices. One of the more important problems is concerned with efficiency of the devices, which is determined by the proportion of tunneled electrons that are eventually emitted from the base material. Electrons tunneling through the barrier but not being emitted are trapped by the base and drained off as base current through the base bias connection. Therefore, efficient tunnel-emission devices must provide a large number of emitted electrons with relatively small base currents.

Primarily, base current is derived from those electrons which have tunneled through the barrier but emerged with insufficient energy to clear the barrier, or base work function, on the other side of the base. Since these electrons are unable to escape the base material, they are trapped in the base and result in current flow through the biasing circuit. Therefore, the efficiency of tunnel-emission devices may be increased by providing maximum discrimination against tunneling of electrons from filled states in the emitter into those energy states in the base which are "blocked" by the vacuum work function in the case of a tunnel cathode, or the potential barrier of the sluice in the case of a tunnel-emission amplifier. Previously known tunnel-emission devices have been constructed by thin film deposition techniques to provide a metallic emitter, an insulation barrier, and a thin metallic base. The metallic emitter provides an abundant source of electrons from its upper filled energy levels, but other electrons from lower energy levels also tunnel through the barrier into the blocked states in the base.

Attempts have been made in the past to prevent loss of efficiency due to tunneling into blocked states in the base by utilizing tunnel barriers of sufficient thickness so that the probability of an electron tunneling through the barrier is appreciable only for those electrons which are located near the Fermi surface in the emitter. Only these electrons possess energies produced by the emitter-base bias voltage which are well above the energy required for an electron in the base to overcome the base-vacuum work function or, in the case of an amplifier, energies which are well in excess of the base-sluice work function. When operating under these circumstances, those electrons which do successfully tunnel through the barrier also emerge into the conduction band of the tunnel barrier instead of into empty states in the base. As a consequence for the tunneled electrons to be successfully emitted into the vacuum or sluice, they must traverse both the remainder of the barrier and the base without losing so much energy that they become trapped in blocked states in the base. Unfortunately, because of the greater distance that a tunneled electron must travel before reaching vacuum (or the sluice) and because of the much greater probability that an electron will experience an energy losing transition due to the increased electron energy, these attempts to improve the emission efficiency of tunneling devices by utilizing relatively thick tunnel barriers have not been successful.

Therefore, it is an object of the present invention to provide tunnel-emission devices having increased efficiency in emitting tunneled electrons.

Another object of this invention is to provide improved solid state devices known as tunnel-emission cathodes and tunnel-emission amplifiers having narrow band emitters.

A further object of this invention is to provide tunnel-emission devices (cathodes, amplifiers, etc.) with a low noise figure; i.e. devices in which the spread of the velocities and energies of the emitted electrons is smaller than in thermionic or earlier versions of tunnel-emission devices.

In the present invention, a tunnel cathode of high emission efficiency is achieved by the use of an emitter material having a conduction band containing electrons whose spread in energies extends over a very narrow range, in other words, emitters which are not commonly regarded as metals. In one embodiment, the emitter is constructed of a heavily doped n-type semiconductor material known to have a narrow band of occupied levels at the bottom of a conduction band, the narrow band being separated from a valence band by a forbidden energy gap. This n-type semiconductor material is boned to one side of a thin dielectric material which, in operation, is to serve as the tunnel barrier. To the opposite side of the thin dielectric material is bonded a thin metal layer, which is to serve as the base. The tunnel barrier and base are constructed of materials and by methods commonly used in the fabrication of tunnel-emission devices.

Additionally, any presently known treatment of the exposed surface of the base, that is, the side of base not bonded to the dielectric layer, may be used to lower the vacuum work function of the base since the treatments will not in any way reduce the usefulness of the narrow band emitter as a means for achieving greater emission efficiency. Indeed, devices constructed by the combined use of both a narrow band emitter and judicious surface treatments of the base can be expected to result in the highest emission efficiency.

In a second embodiment according to the invention another tunnel-emission device is provided which is known as a tunnel-emission amplifier. In this embodiment the heavily doped n-type semiconductor, the dielectric and the metal are bonded as before to form the improved tunnel-emission cathode. Additionally, a somewhat thicker layer of an intrinsic semiconductor or a dielectric material is bonded on the opposite side of the base to serve as the sluice. On the opposite side of the sluice a metal layer is bonded to serve as collector.

By analogy to the surface treatments employed with the base of a tunnel-emission cathode, it is possible to dope the sluice with appropriate impurities in order to warp its conduction band in such a manner as to obtain improved transmission efficiency of the amplifier. Since such doping can result in improved transmission efficiency for amplifiers constructed from materials previously utilized in the art of making tunnel-emission amplifiers, then even greater transmission efficiency can result when amplifiers are constructed with the narrow band emitters of the present invention.

Certain materials have a conduction band located intermediate a full energy band and an empty energy band. Generally such materials possess an electrical conductivity midway between that of a metal and a good semiconductor, and for this reason are sometimes called semimetals. Some materials having these characteristics are titanium monoxide (TiO), titanium sesquioxide ($Ti_2O_3$), and vanadium sesquioxide ($V_2O_3$). These materials are found in the group generally identified as transition metal oxides. Other materials possessing a narrow conduction band may be synthesized from semiconductors or insulators by heavily doping them with impurities which are selected to produce local energy levels located sufficiently far from either the conduction band or valence band that the narrow conduction band formed under heavy doping does not overlap either the conduction or the valence bands of the intrinsic material. The emitters of tunnel-emission devices, in accordance with the invention, may be constructed of these materials in place of the aforementioned n-type semiconductors, since they also provide a source of electrons available for tunneling, whose spread in energies extends over a narrow range.

To obtain optimal efficiency, tunneling devices constructed with narrow band emitters, in accordance with the above representative embodiments of the invention, should be operated with an emitter-base bias voltage just large enough to raise the narrow band of available electrons in the emitter to a level of energy slightly above that required for an electron to surmount the base-vacuum or base-sluice work function (as the case may be). Under these operating conditions, the amount of scattering of the tunneled electrons is minimal. Correspondingly, the fraction of the tunneled electrons which are trapped in those base states blocked by the work function is also minimal, i.e. the emission efficiency is a maximum.

The energy distribution of the electrons emitted from a tunnel-emission device having a narrow band emitter and operated in accordance with the conditions described above for maximum emission efficiency is restricted both by the narrow width of the energy band of the electrons available for tunneling and by the small amount of permitted scattering which will still enable the tunneled electrons after traversing the base to overcome the base work function. Thus, the intrinsic noise power in the emitted stream of electrons is significantly reduced from that encountered in tunneling devices constructed in accordance with the prior art. It should be appreciated that with any tunnel-emission device, thermal noise can be reduced to an arbitrarily low value by operating the device at sufficiently low temperatures. (It should be noted that the quantity of tunnel-emission is independent of temperature in contrast to thermionic emission from hot cathodes.)

However, because of the restricted energies of the electrons available for tunneling, the intrinsic "thermal noise" in a beam of electrons issuing from a tunnel cathode is necessarily less when the cathode is comprised of a narrow band emitter than when the cathode is comprised of a conventional metallic emitter. This is an advantage of the narrow band emitter in addition to the aforementioned reduction of non-thermal noise.

A better understanding of the invention may be had by reference to the following description of several embodiments of the invention, taken in conjunction with the accompanying drawings in which.

Figure 3:
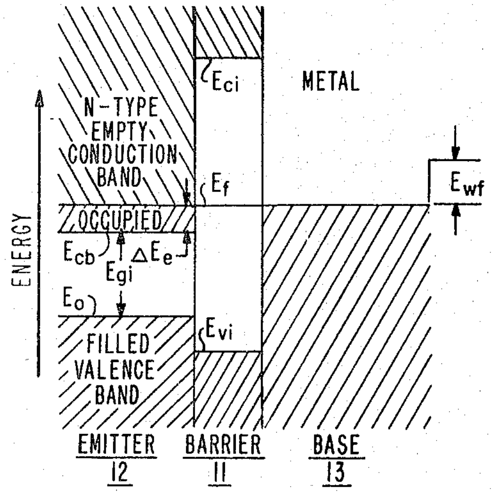
FIG. 3 is an energy level diagram representing the relative energy levels existing in a tunnel-emission device in accordance with the invention in which a heavily doped n-type material is bonded as the emitter to one side and a thin metallic base is bonded to the other side of a thin dielectric barrier material.
Figure 4:
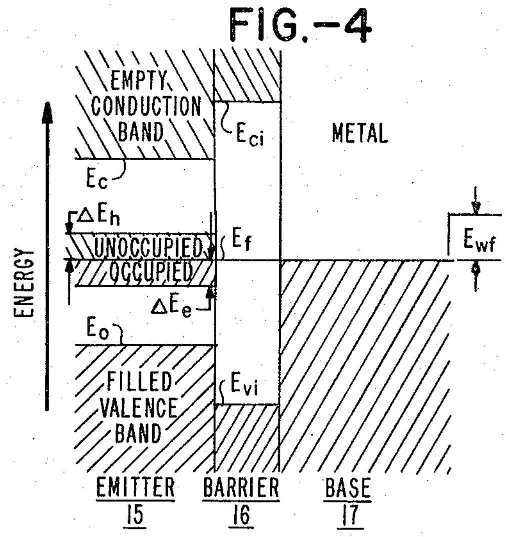
FIG. 4 is an energy level diagram representing the relative energy levels existing in another device in accordance with the invention in which a transition metal oxide material is bonded on one side and a thin metallic film is bonded to the other side of the thin dielectric barrier material.
Figure 8:
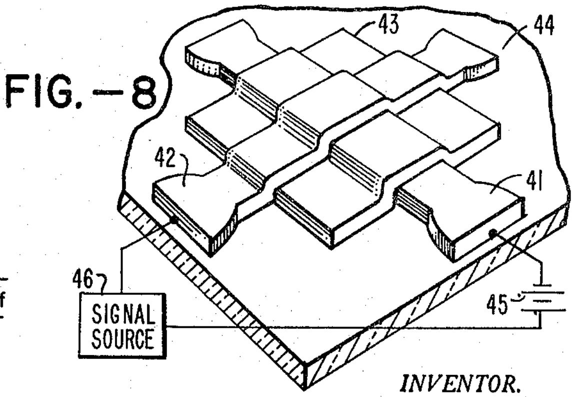
Figure 7:
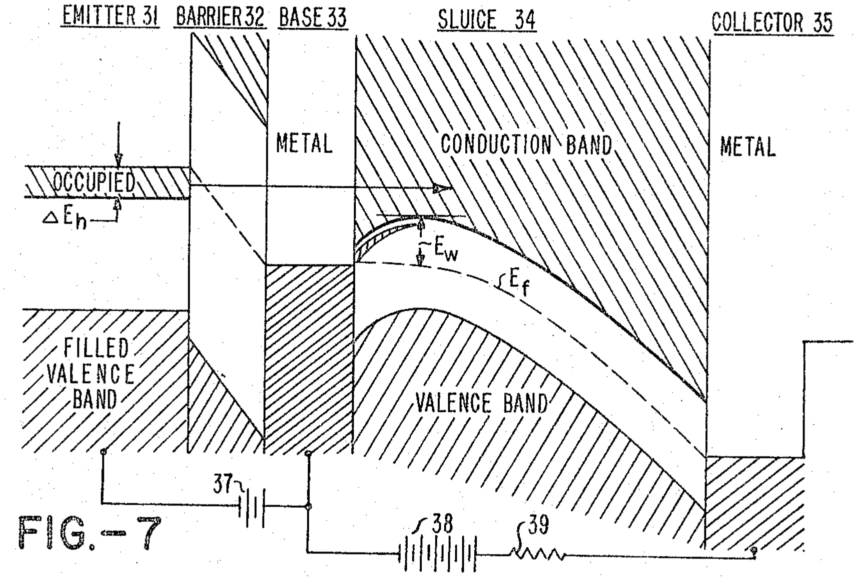
FIG. 7 is an energy level diagram illustrating the operation of a tunnel-emission amplifier as illustrated in FIG. 6.
Figure 6:
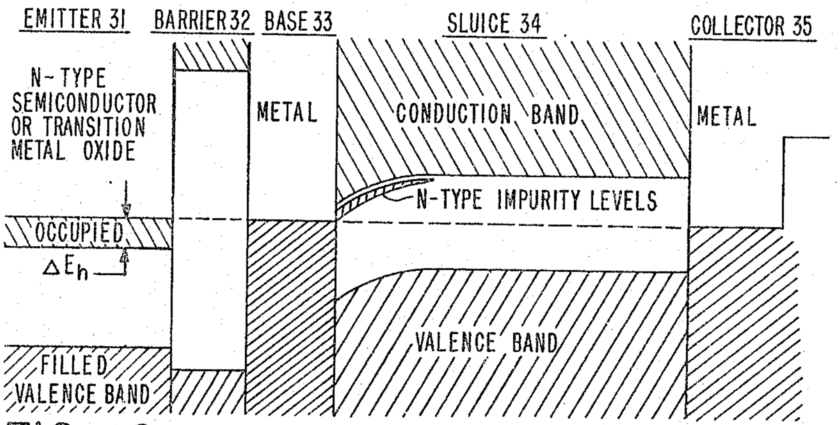
FIG. 6 is an energy level diagram of a tunnel-emission amplifier device employing a narrow band emitter, such as that illustrated in FIGS. 1 and 2.
Figure 9:
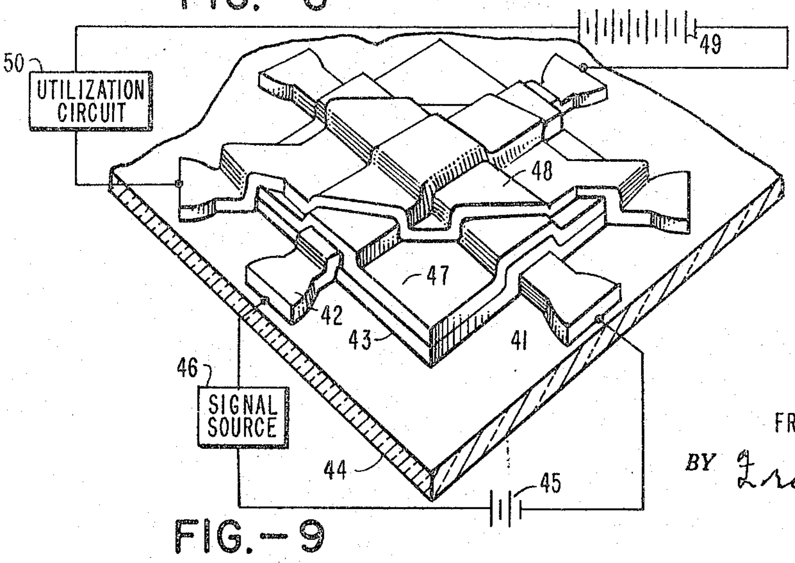

FIG. 8 is an enlarged pictorial illustration of a vacuum deposited tunnel-emission cathode in accordance with one particular arrangement of the invention relating to the energy level diagrams of FIGS. 3 and 4; and FIG. 9 is an enlarged pictorial illustration of a vacuum deposited tunnel-emission amplifier in accordance with another particular arrangement of the invention relating to the energy level diagrams of FIGS. 6 and 7.

Figure 1:
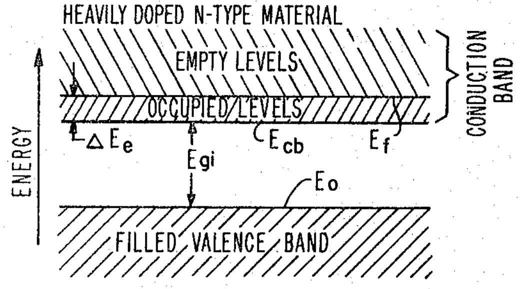
FIG. 1 is an energy level diagram representing the energy levels existing in a heavily doped n-type material.

Referring now to FIG. 1, there is shown an energy level diagram of a heavily doped n-type material. The amount of doping is not critical but should be of sufficient quantity to cause the localized impurity levels common in semiconductive materials to blend together and form an impurity conduction band. For the purposes of this illustration, the resulting impurity conduction band is sufficiently close to the conventional conduction band that the two are coalesced into a single band. Above the energy level $E_o$ at the top of the uppermost normally filled band, sometimes called the valence band, there is a forbidden energy band of width $E_{gi}$. The level of energy at the top of the forbidden band is coincident with the bottom $E_{cb}$ of the conduction band. The Fermi level $E_f$ defines the level of energy separating the occupied and unoccupied levels at absolute zero in temperature. The distance $\Delta E_e$ between the lowest level of the conduction band $E_{cb}$ and the Fermi level $E_f$ represents those levels in the conduction band occupied by electrons. FIG. 1 is fairly representative of the energy level distribution in any heavily doped n-type semiconductor material.

Figure 2:
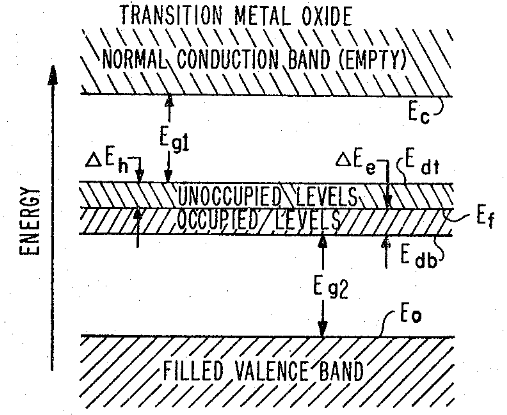
FIG. 2 is an energy level diagram representing the relative energy level distribution of a transition metal oxide material.

Referring now to FIG. 2, there is shown an energy level diagram of a material having the characteristic feature of a "narrow conduction band" located intermediate a full energy band and an empty energy band. The particular material represented is typical of one of the transition metal oxides previously referred to in which conduction occurs in the 3d band indicated as the region $E_{dt}-E_{db}$. The 3d band is located intermediate the filled valence band and the normal conduction band which is empty. A forbidden energy band, identified as $E_{g1}$, separates the 3d band from the filled valence band and is substantially wider than the 3d band. Similarly, second forbidden energy band, identified as $E_{g2}$, separates the empty conduction band from the 3d band and is substantially wider than the 3d band. The 3d band is only partially full, and therefore supports conduction. The Fermi level $E_f$ lies somewhere intermediate the $E_{dt}$ and $E_{db}$ levels, as indicated, and essentially separates the occupied and unoccupied levels in the 3d band, which are labeled $\Delta E_e$ and $\Delta E_h$, respectively. The energy level distribution shown in FIG. 2 is representative of any semimetallic material which possesses a narrow conduction band.

FIG. 3 illustrates by an energy level diagram a tunnel-emission cathode device according to the invention that provides a thin dielectric material as the energy barrier 11 between a heavily doped n-type material (as illustrated in FIG. 1) bonded on one side as an emitter 12, and a thin metal film bonded on the other side as the base 13. The energy levels in this illustration are presented in conventional fashion with the respective Fermi levels in alignment due to the fact that all substances in contact with each other and in thermal equilibrium seek a common Fermi level. The only allowed energy levels within the thin dielectric barrier 11 which are illustrated in FIG. 3 are near the top of the valence band $E_{vi}$ and near the bottom of the conduction band $E_{ci}$. The Fermi level lies approximately midway between $E_{vi}$ and $E_{ci}$ in the forbidden band of the dielectric barrier. The only requirement on the band structure of the dielectric barrier 11, which may be either an insulator or an intrinsic semiconductor, is that the forbidden energy gap be substantially larger than the work function barrier $E_{wf}$ of the metal base 13, which is normally assured for most good insulators.

The actual thickness of the tunnel barrier must be determined empirically. It should not be much thinner than is required to allow appreciable tunneling when a base-emitter bias voltage is applied of sufficient strength to raise the set of occupied levels in the emitter above the work function of the base. It should be emphasized that one of the salient features of the present invention is that the required thickness of the tunnel barrier when a narrow band emitter is employed is not as critical as is required to obtain emission when a metallic emitter is employed. Typically, the barrier may be of the order of 100 Angstroms thick in order to have the desired significant tunneling probability. Such a thin barrier may be constructed of a polymerized silicone film formed by the techniques disclosed, for example, in an article entitled, "Formation of Thin Polymer Films by Electron Bombardment," by Robert W. Christy, in the Journal of Applied Physics, vol. 31, pp. 1680–1683, September 1960. Such a polymerized dielectric or insulating film may, for example, be made by subjecting the surface of the emitter 12 to electron bombardment in an environment of silicone oil vapor, the electron beam creating a solid polymer film of controllable thickness on the surface of the emitter 12.

The thin metal base 13 may be vacuum deposited in a similar manner over the already deposited barrier 11. The thickness of the base 13 should be kept to a minimum to prevent unnecessary scattering of the tunneled electrons, but must be sufficiently thick to prevent substantial potential differences from occurring at different points on its face. The optimum thickness of the base layer 13 is determined by the overall performance characteristics desired and is a function of the mean-free-path of the electrons traversing the metal. However, for most purposes thicknesses of the order of 100 Angstroms may be used. When a heavily doped n-type semiconductor material is used for the emitter 12, a layer of magnesium oxide or cesium, for example, may be applied as a surface treatment to the outside of the metal base 13 to lower the work function. It should be understood that any surface treatment capable of reducing this work function is desirable for increased efficiency, as already mentioned.

Referring now to FIG. 4, a tunnel-emission cathode is shown with an emitter member 15 of a material having the characteristics of a transition metal oxide (as illustrated in FIG. 2) bonded to one side of a thin dielectric film 16, and a base member 17 of metal bonded to the opposite side. Like the n-type semiconductor material 12 illustrated in FIG. 3, the transition metal oxide emitter 15 has a narrow band of occupied energy levels separated by a substantial gap from the top energy level $E_o$ of the filled valence band. As before, the Fermi levels of the different materials are in alignment as a result of electron transport upon contact. As indicated previously, among existing materials having the desired energy band characteristics are titanium monoxide (TiO), titanium sesquioxide( $Ti_2O_3$), and vanadium sesquioxide ($V_2O_3$). A more complete analysis of transition metal compounds suitable for use in the present invention is given in a book entitled "Semiconductors," edited by N. B. Hanney, published by Reinhold Publishing Corporation, in 1959, and in particular chapter 14 by F. J. Morin. The dielectric barrier 16 and the metallic base 17 of FIG. 4 may be vacuum deposited as before to produce the relatively thin uniform layers required. Ideally, the barrier 16 is composed of the electron polymerized siloxanes and the outer surface of the base 17 may be given a surface treatment to reduce the work function by the deposition of very thin tandem insulator and metal layers, in a manner known in the art.

Figure 5:
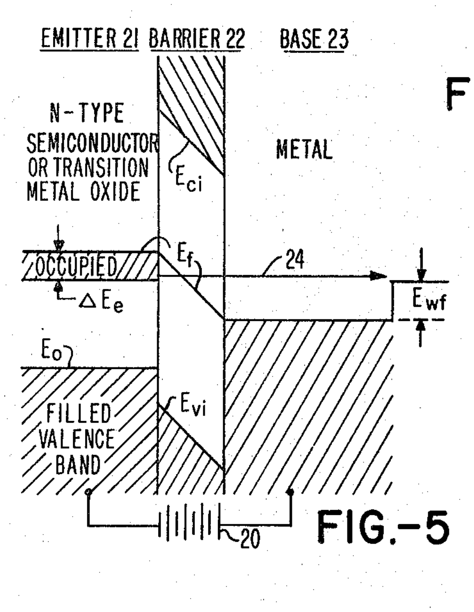
FIG. 5 is an energy level diagram representing the relative energy levels existing in the operation of a tunnel emission device such as is shown in FIGS. 3 or 4.

Referring now to FIG. 5, there is shown a generalized energy level diagram illustrating the operating of a tunnel-emission cathode according to the invention. A small positive voltage from the bias source 20 shifts the entire energy level distribution of the metallic base 23 downward with respect to the energy level distribution of the emitter 21 (an n-type semiconductor or transition metal oxide) containing the narrow band $\Delta E_e$ of filled energy states. The Fermi level in the dielectric barrier 22 becomes replaced by a quasi-Fermi level which is tilted so that it matches the Fermi levels of the two materials of the base 23 and the emitter 21. Now, occupied levels in the emitter material 21 occur directly across (i.e., at the same energy level) from unoccupied levels above the Fermi level of the metallic base 23. Conditions are now satisfied for electron tunneling to occur.

If the tunneled electrons emerge at energy levels in the base below the top of the potential barrier produced by the work function $E_{wf}$ of the metallic base 23, these electrons are effectively blocked from escaping the metal surface and are drawn off as current flow to the bias source 20. The voltage can be increased between the emitter 21 and the base 23 until the entire narrow occupied band $\Delta E_e$ lies directly across from energy states in the base 23 which are slightly above the work function barrier $E_{wf}$. At this point none of the electrons tunneling directly across the barrier 22 (as represented by the arrow 24) emerge into the blocked states of the base 23, since no occupied energy levels in the emitter 21 lie directly across from energy states blocked by the work function of the base. The blocked states in the base 23 are now opposite only the forbidden energy gap in the emitter 21 between the occupied band $\Delta E_e$ and the top energy level $E_0$ of the filled valence band. This is a condition not realizable with tunnel-emission devices of the prior art which employ metallic emitters. A small number of the tunneled electrons may still fail to surmount the work function $E_{wf}$, due to losses of energy incurred in localized traps in the barrier 22 or due to scattering in the base 23. However, this number can be kept to a minimum by operating the device with an emitter-to-base voltage only slightly larger than that required to raise the bottom of the conduction band in the emitter to a level of energy equal to the first unblocked state in the base. This is the optimum condition for operation, since increasing the emitter-to-base voltage above this level greatly increases the amount of scattering in the base. This is a consequence of the well-known exclusion principle which states that scattering can only take place into lower unoccupied states; therefore, if the electrons emerge into higher energy states in the base than is necessary to clear the work function, more unoccupied states are made available for scattering. Hence, the mean-free path of an electron in the base decreases as the energy of that electron increases.

A tunnel-emission cathode employing a narrow band emitter in accordance with the present invention, as illustrated in FIG. 5, provides a highly efficient source for electron emission into vacuum for use in a variety of practical applications. For example, the smaller and more durable solid state tunnel-emission cathodes may be employed in place of the hot cathode in any of a variety of related present devices, such as vacuum tube amplifier, klystrons, etc. The stream of emitted electrons also may be employed as a connecting link between two separate circuit points in a vacuum environment.

In tunnel-emission devices employing a metallic emitter in accordance with prior art, the barrier is constructed somewhat thicker, and a sufficiently large bias voltage is applied to cause tunneling into the conduction band of the emitter. Tunneling into empty states in the base which are blocked by the base-to-vacuum work function is thereby suppressed because of the greater height and thickness of the tunnel barrier. This is possible because the tunneling probability decreases very rapidly with increasing height and thickness of the barrier. Unfortunately, the mechanisms for an electron to lose energy as it traverses the conduction bands of the barrier and base are so great that a high percentage of the electrons which do successfully tunnel into the conduction band of the barrier subsequently become trapped in the base as the result of energy-losing transitions into the blocked base states. Attempts to reduce the energy losses and the distance of travel to the vacuum on the opposite side of the base by reducing the barrier thickness have not been successful, because it then becomes more difficult to prevent electrons with energies significantly below the Fermi surface in the emitter from tunneling into empty blocked states in the base. This difficulty can not obtain with a narrow band emitter of the present invention.

It should also be noted that a broad spread of energies resulting from energy-losing transitions (scattering) of the emitted electrons is possible if a large emitter-to-base bias voltage is applied to raise the Fermi level of the emitter well above the work function of the base. Therefore, the noise due to scattering in the current emitted from a conventional device is much greater than from a narrow band emitter. Furthermore, electrons thermally excited above the Fermi level in the emitter can also tunnel through the barrier to be emitted, thus giving rise to the well-known thermal noise effect in cathode emitters. Thermal noise imposes serious limitations on utilization of conventional thermionic cathodes as low signal detectors and amplifiers, but this noise can be greatly reduced in tunnel cathodes because they are able to operate at lower temperatures.

A further means of lowering thermal noise, which is not possible with metallic emitters, is to utilize an emitter with a very narrow conduction band ($\Delta E_h+\Delta E_e$) as was illustrated in FIG. 4. In this case the spread of energies of the emitted electrons is necessarily restricted to the width of the conduction band, which might in some cases be made less than $kT$ (Boltzmann's constant times the absolute temperature). It is possible by this means to substantially eliminate what is known as "shot" noise in amplifiers.

Referring now to FIG. 6, a tunnel-emission amplifier device in accordance with the invention is illustrated generally in an energy level diagram. The emitter 31, the barrier 32, and the base 33 are arranged as previously illustrated to form a tunnel-emission cathode, and a sluice layer 34 and a metal collector 35 are added for amplifier operation. The emitter element 31 may comprise a heavily doped n-type semiconductor or a transition metal oxide having the narrow occupied energy band characteristics desired, as previously described. The sluice layer 34 is a relatively thicker layer contacting the other side of the base 33 and may be composed of an intrinsic nonmetallic material, that is, an intrinsic semiconducting material or insulating material. The collector 35 is composed of a metal layer sufficiently thick to capture almost all electrons passing through the sluice layer 34.

Referring now to FIG. 7, the function of the different layers of the tunnel amplifier according to this invention can best be explained by reference to the operation of the device. A small bias potential from a voltage source 37 is applied between the emitter 31 and the base 33 to obtain tunneling of the electrons from the narrow occupied band $\Delta E_h$ in the emitter 31 to available unoccupied levels in the metal base 33, as previously described in connection with the tunnel-emission cathode of FIG. 5. Additionally, a much larger potential from a power source 38 is applied between the base 33 and the metal collector 35 across the sluice 34. A tunneled electron emitted from the base 33 into the conduction band of the sluice material 34 is then attracted toward the collector by the downward potential slope. However, the emitted electrons must have sufficient energy to mount the top of the potential barrier $E_w$ presented by the sluice material 34; this barrier height $E_w$ may be referred to as the height of the "weir" to complete the analogy to an actual sluice. This potential barrier $E_w$ to the tunneled electrons replaces the vacuum work function $E_{wf}$ encountered in the tunnel-emission cathode previously illustrated. In general the height of the weir is determined by the intrinsic properties of the base and sluice, and by the distribution and type of impurities in that portion of the sluice in proximity with the base.

If the base bias is reduced from that shown in FIG. 7 to a point where only a portion of the narrow occupied band $\Delta E_h$ in the emitter 31 is at a level of energy above the weir, then only electrons from the higher energy levels of that portion can surmount the weir and be attracted to the collector. The remainder of the electrons are blocked by the weir and reflected back into the base for flow through the biasing circuit as base current. A very small change in the bias voltage is capable of changing the amount of conduction between the base 33 and the collector 35 from a maximum to cutoff. Therefore, a relatively small signal voltage can be applied in the bias circuit between the emitter 31 and the base 33 to effect large changes in current through the collector 35. The amount of current may be registered across a load resistor 39 connected in the base-to-collector circuit.

It is desirable in many instances to reduce the barrier height of the weir $E_w$ by controlled doping of the sluice material. As shown in FIGS. 6 and 7, the work function barrier between the base 33 and the sluice 34 can be substantially reduced by the addition of large amounts of n-type impurities to the intrinsic semiconductor or insulator material of the sluice 34 at the base-sluice interface. The amount of doping is then gradually reduced as the sluice layer is built up toward the collector 35. In this manner the rounded weir effect illustrated is obtained. It should be appreciated that, in addition to changing the height of the weir, the added impurities can cause scattering and trapping of the electrons approaching the weir. Thus the doping should be done judiciously in order to obtain a net increase of transmission efficiency. The optimal amount of doping can be determined by trial and error.

Previously effective operation of tunnel-emission amplifiers has largely been limited by current density and area limitations. The first of these limitations arise from possible space charge accumulation in the sluice. The second arises from voltage drop tangentially along the base due to the outflow of base current which results in a self-biasing effect tending to shut off the emission. A relatively thin sluice avoids space charge limitations and also aids in the frequency response of the tunnel-emission amplifier. A high base transmission coefficient and low "base-sheet resistance" permit larger area emitters. The transmission coefficient may be defined as the ratio of the current entering the sluice 34 to the current emerging from the tunnel barrier 32, and may be closely related to the efficiency of a tunnel-emission cathode. Accordingly, the transmission coefficient is greatly enhanced by using the narrow band emitter 31 in accordance with the present invention, as illustrated in FIGS. 6 and 7.

The two features of the five layer tunnel-emission amplifier which cause high frequency limitation in most cases are the RC time constant of the emitter-to-base circuit and the transit time of electrons from the base to the collector. Studies have shown that a high figure of merit is assured by high tunnel current which is accomplished by making the tunnel barrier as thin as compatible with the criteria discussed earlier for optimizing the transmission efficiency. The base-to-collector transit time is proportional to the square of the width of the sluice layer and inversely proportional to the base-to-collector voltage where the thickness of the sluice layer is at least equal to the mean free path of an electron in the sluice material. From this it can be seen that thin sluices of high mobility material are desirable from a frequency response standpoint. For sluices 1 micron thick, and collector-to-base voltages of 10 volts, millimicrosecond operation is possible even when the mobility is one thousand times lower than is normal for good single crystal germanium.

Electrons approaching the sluice 34 from the emitter 31 may be reflected back to the base 33, even though they have sufficient energy to surmount the weir $E_w$. This is strictly a quantum mechanical effect and is quite analogous to the reflection of electromagnetic waves when passing through a medium of changing index of refraction. Indeed, the expression for the reflection coefficient of electrons from an abrupt barrier is identical to that for reflection microwaves in a wave guide where an impedance mismatch occurs. As pointed out earlier, the analogous "impedance" mismatch at the base-sluice interface can be reduced or eliminated by the use of impurities to tailor the energy bands in the sluice 34. With the rounded energy barrier shown, the conduction band is moved closer to the Fermi level and there is no abrupt change in potential at the innerface. For best results in a thick sluice, the semiconductor material of the sluice 34 is doped so that its Fermi level is located at the same energy level as the Fermi level in the metal base 33. The doping of the sluice is gradually reduced as the distance increases from the base-sluice interface. For a thin sluice, tailoring of the energy bands is somewhat more complicated, but is accomplished in a similar manner except that consideration must now be given also to the total number of impurities added to the sluice.

Since the total number of impurities in the sluice 34 should be kept at a minimum in order to reduce scattering of electrons or localized traps due to the impurities, it is desirable to select initially the most compatible base and sluice materials possible. A general criterion for selection of an appropriate sluice material is that the "electron affinity" of the sluice (that is, the energy difference between the bottom of the conduction band of the intrinsic semiconductor material and the level at which an electron can escape from the sluice into vacuum) should be only slightly less than the work function of the base metal. It is particularly important that the impurities on the base side of the weir be kept at a minimum. This is assured by warping the band as sharply as possible so that the top of the weir lies close to the base 33. Quantum mechanical reflections can be eliminated in this manner if the fractional change in energy in a fraction of a wave length of an electron is small compared to unity. This criterion may be recognized as the well known WKB criterion for the applicability of a classical description of the motion of an electron.

Other precautions and considerations which may be taken into account are important to the construction of the sluice 34. First, the top of the weir should be kept within the mean free path of an electron from the emitter. Next, the energy levels of the added impurities should be deep enough so that they are not easily ionized thermally, since thermal ionization of the impurities results in a background current and unwanted noise. Lastly, if too many impurities are added, avalanche breakdown may be initiated by thermal ionization or by higher energy tunneling electrons.

Referring now to FIG. 8, there is shown a pictorial illustration of a tunnel-emission cathode in accordance with the present invention constructed by the method of vacuum deposition. Known vacuum deposition techniques permit fabrication of the tunnel-emission devices of the invention. The n-type semiconductor materials disclosed may be vacuum deposited according to techniques disclosed in Patent No. 2,938,816, entitled "Vaporization Method of Producing Thin Layers of Semi-conducting Compounds." With the transition metal oxides which are in reduced form, the degree of oxidation may be controlled by either evaporating the metal in a controlled oxygen atmosphere or evaporating the metal oxide in a controlled reducing environment in which reduction may be effected by an impinging electron beam.

The vacuum deposited emitter and base materials, 41 and 42 respectively, are separated and insulated from each other by means of the barrier film 43. As has been previously indicated, the film 43 may be a polymerized insulating film of the order of 100 Angstrom units in thickness, made by subjecting the material 41 to electron bombardment in an environment of silicone oil vapor. The impinging electron beam thereby creates a solid polymer film on the material 41. In actual practice, the emitter material 41 is first deposited on a suitable substrate 44 by using a conventional mask with a cutout in the desired shape. The barrier layer 43 and the base layer 42 are then deposited in turn by the use of appropriately shaped masks on the substrate material 44. Appropriate connections may be made to the emitter 41 and base 42 for coupling a bias source 45 and, if desired, a signal source 46 for modulating the emission so that the desired operation can be obtained.

In FIG. 9, there is shown an enlarged pictorial illustration of a tunnel-emission amplifier in accordance with the present invention produced by the method of vacuum deposition. The three layers 41, 42 and 43 for the tunnel-emission cathode are deposited as before. Additionally, by use of vacuum deposition techniques with appropriately shaped and positioned masks, the sluice layer 47 and the collector layer 48 are deposited one above the other. The sluice layer 47 may alternatively be constructed of a single crystal semiconductor with the additional doping being done by controlled fusion while in a vacuum system. If the preferred method of depositing the sluice layer 47 is employed, the desired distribution of impurities can be built into the semiconductor during the process of deposition. The sluice layer 47 in any case insulates the top collector layer 48 from contact with the other layers. Connections may then be made to the ends of the evaporation deposited strips 42 and 48 to couple an appropriate voltage source 49 and utilization circuit 50 to the collector and base layers.

In depositing the sluice layer 47, the mask must be slightly larger than that needed to merely cover the underlying base layer 42 in order to avoid the formation of an emitter-barrier-collector sandwich at any point on the surface. This is necessary because such a sandwich would result in the very large emitter-to-collector voltage being applied with destructive effect across the thin barrier layer 43. Conveniently, this may be avoided by using the same size mask for both barrier and sluice layers as shown.

Ideally, these vapor deposited devices should be made on a thermally conductive substrate, with the collector next to the substrate 44. Such an arrangement facilities the outflow of heat generated by the electron striking the collector. This is the reverse order of deposition from that which is shown in FIG. 9 for ease of illustration. From the foregoing, it may be seen that in deivces using narrow band emitters in accordance with the invention, electrons are almost completely prevented from tunneling into states blocked by the vacuum work function, thereby providing increased efficiency and less noise due to scattering. This allows a great deal more freedom in meeting optimization criteria for the remainder of the structural elements, and provides many other advantages.

While the invention has been particularly shown and described with reference to preferred embodiments in simplified exemplifications thereof, it will be understood by those skilled in the art that the foregoing and other changes in form and details may be made therein without departing from the spirit and scope of the invention. Accordingly, any and all modifications, variations or equivalent arrangements falling within the scope of the annexed claims should be considered to be a part of the invention.

What is claimed is:

1. An electrical apparatus comprising a thin dielectric film, a first member bonded to one side of said film, and a second member bonded to the other side of said film, said first member being of a material having a narrow conductive energy band located above a substantially wider forbidden energy gap, said second member being a thin film of metallic material having a thickness in the order of the mean free path of an electron therein and having an external work function preventing the escape of electrons from the lower unoccupied energy levels, a source of operating voltage for establishing an operating potential between said first and second members across said thin dielectric film, and said dielectric film having a thickness permitting appreciable quantum mechanical tunneling of electrons from said first member through the dielectric film into said second member only when the amplitude of an operating potential establishes the potential of the occupied energy levels of the narrow conductive energy band of said first member substantially at or above the potential level of the work function of said second member.

2. The electrical apparatus of claim 1 in which the material of said first member comprises a heavily doped, n-type semiconductor.

3. An electrical apparatus according to claim 1 wherein said thin dielectric film comprises an insulator of the order of 100 Angstroms in thickness.

4. An electrical apparatus according to claim 1 wherein said thin dielectric film is a substantially pure semiconducting material of the order of 100 Angstrom units in thickness.

5. An electrical apparatus according to claim 1 wherein said thin dielectric film is an electron polymerized siloxane.

6. An electrical apparatus according to claim 1 wherein the material of said first member is a transition metal oxide.

7. An electrical apparatus according to claim 6 wherein the material of said first member is vanadium sesquioxide.

8. An electrical apparatus according to claim 6 in which the material of said first member is titanium sesquioxide.

9. An electrical apparatus according to claim 1 wherein the material of said first member is a semiconductor having a narrow impurity conduction band intermediate an intrinsic conduction band and a valence band.

10. An electrical apparatus according to claim 1 wherein the material of said first member is an insulator having a narrow impurity conduction band intermediate the intrinsic conduction band and the valence band.

11. An electrical apparatus comprising a thin dielectric film, an n-type semiconducting first member bonded to one side of said film, and a second member bonded to the other side of said film, said n-type semiconducting member having a narrow conductive energy band located above a substantially wider forbidden energy gap, said second member being a thin film of metallic material having a thickness in the order of the mean free path of an electron therein and having an external work function preventing escape of electrons from lower unoccupied energy levels, a source of operating voltage for establishing an operating potential between said first and second members across said dielectric film, and said dielectric film having a thickness permitting appreciable quantum mechanical tunneling of electrons from said n-type semiconducting first member into said second member only when the amplitude of said operating potential establishes the potential of the occupied energy levels of the narrow conductive energy band of said n-type semiconducting first member substantially at or above the potential level of the work function of said second member.

12. An electrical apparatus comprising a thin dielectric film, a first member bonded to one side of said film, and a second member bonded to the other side of said film, said first member being a transition metal oxide having a narrow conductive energy band located above a substantially wider forbidden energy gap, said second member being a thin film of metallic material having a thickness in the order of the mean free path of an electron therein and having an external work function preventing escape of electrons from lower unoccupied energy levels, a source of operating voltage for establishing an operating potential between said first and second members across said thin dielectric film, and said dielectric film having a thickness permitting appreciable quantum mechanical tunneling of electrons from said first member into said second member only when the amplitude of said operating potential establishes the potential of the occupied energy levels of the narrow conductive energy band of said first member substantially at or above the potential level of the work function of said second member.

13. An electrical apparatus comprising a thin dielectric film, a first member bonded to one side of the film, a second member bonded to the other side of said film, said first member being of a material having a narrow conductive energy band located above a substantially wider forbidden energy gap, said second member being a thin film of metallic material having a thickness in the order of the mean free path of an electron therein and having an external work function preventing escape of electrons from lower unoccupied energy levels, and biasing means for applying an operating voltage between the first and second members of sufficient amplitude to raise the occupied energy levels of the narrow conductive energy band of said first member above the work function of said second member, said dielectric film being of a thickness allowing appreciable quantum mechanical tunneling of electrons from said first member into said second member only when the amplitude of the operating voltage raises the occupied energy levels of the narrow conductive energy band of said first member to a potential level substantially at or above the potential level at the top of the external work function of said second member.

14. An electron emission apparatus comprising a thin dielectric film with first and second members bonded on opposite sides thereof, said dielectric film having a thickness permitting appreciable quantum mechanical tunneling of electrons from said first member into said second member, said second member being a thin film of a material having a thickness in the order of the mean free path of an electron therein and having a broad band of unoccupied energy levels with a potential barrier blocking the escape of electrons from some of the lower unoccupied levels, said first member having a narrow band of occupied energy levels located above a broad forbidden energy gap, and means for providing an operating potential between said first and second members to raise some of said occupied energy levels in the narrow band above the top of the potential barrier, said dielectric film being of a thickness to permit appreciable tunneling of electrons into unoccupied levels of said second member only when said operating voltage has an amplitude sufficient to raise the occupied energy levels in said first member to a potential level substantially at or above the top of said potential barrier.

15. A source of free electrons comprising a thin dielectric film having a thickness permitting finite quantum mechanical tunneling to take place, an emitter member bonded to one side of said dielectric film, and a base member bonded to the other side, said base member being a thin metal film with a thickness permitting the passage of electrons completely therethrough and having a potential barrier preventing electrons in only the lower unoccupied energy levels from escaping its surface opposite said dielectric film, and said emitter member having a narrow band of occupied energy levels intermediate upper unoccupied energy levels and a lower broad forbidden energy gap, said broad forbidden gap having a greater width than said barrier, a source of operating voltage for establishing an operating potential between said emitter and base member, the thickness of said thin dielectric film being selected to permit appreciable quantum mechanical tunneling of electrons from said emitter member through the dielectric film into said base member only when the amplitude of said operating potential establishes a potential of the occupied energy levels at the narrow conductive energy band of said emitter member substantially at or above the top of said potential barrier, whereby tunneling of electrons into the lower unoccupied energy levels in the base member blocked by the potential barrier substantially eliminated.

16. An amplifier device comprising a thin dielectric film having a thickness permitting appreciable quantum mechanical tunneling of electrons therethrough, first and second members bonded to opposite sides of said dielectric film, said first member having a narrow band of occupied energy levels intermediate upper unoccupied energy levels and a lower broad forbidden energy gap, said second member being a thin film having a broad band of unoccupied available energy levels and having a thickness that permits the passage of electrons completely therethrough, a sluice member bonded to the surface of said second member remote from said film, said sluice member being an intrinsic non-metallic material having a forbidden energy gap located intermediate a normally filled valence band and a normally empty conduction band and presenting an energy barrier to prevent the escape of low energy electrons from the second member, a source of operating voltage for establishing an operating signal potential between said first and second members, the thickness of said thin dielectric film being selected to permit appreciable quantum mechanical tunneling of electrons from said first member into said second member only when the amplitude of said operating signal potential establishes the potential of the occupied energy levels of the narrow band in said first member substantially at or above the potential level at the top of said energy barrier, and a metal collector member bonded to the surface of said sluice member remote from said second member to receive electrons escaping the second member and surmounting the energy barrier in the sluice member.

17. The amplifier device of claim 16 wherein the sluice material contains a concentration of impurities, said impurity concentration being gradually reduced from the second member toward the collector and being sufficiently large only in a small portion adjacent the second member to substantially lower the conduction band of the sluice material in order to lower the energy barrier of the sluice member.

18. The amplifier device of claim 16 wherein said source of operating voltage comprises a first bias voltage source connected between the first and second members to raise the narrow band partially above the level of the energy barrier of the sluice member, a second bias voltage source connected between the metal collector member and the second member to substantially lower the level of the energy gap in the portion of the sluice member adjacent the metal collector member, and input means for applying a signal to the second member to vary the voltage applied to the second member, whereby the flow of electrons to the metal collector member is controlled by the voltage applied to said second member.

19. An electric circuit comprising electron emission means including a source of electrons which includes a thin dielectric film having a thickness permitting finite quantum mechanical tunneling of electrons therethrough, an emitter member bonded to one side of said dielectric film, and a base member bonded to the other side of said dielectric film, said base member being a thin metal film having a thickness that permits passage of electrons completely therethrough and having a potential barrier preventing electrons in lower unoccupied energy levels from escaping the surface of the base member remote from said dielectric film, said emitter member having a narrow band of occupied energy levels intermediate an upper unoccupied energy band and a lower broad forbidden energy gap, said forbidden gap having a width greater than said barrier, a source of operating voltage for establishing an operating voltage between said emitter and base members, the thickness of said thin dielectric film being selected to permit appreciable quantum mechanical tunneling of electrons from said emitter member through said thin dielectric film into said base member only when the amplitude of said operating potential establishes the potential of said narrow band of occupied energy levels in said emitter member substantially at or above the potential level at the top of said potential barrier in said base member, and electron receiving means disposed adjacent said base member for conducting electrons escaping the surface of said base member remote from said dielectric film.

References Cited by the Examiner

UNITED STATES PATENTS

| | | | |
|---|---|---|---|
| 2,766,509 | 10/1956 | Le Loup et al. | 317—238 |
| 2,822,606 | 2/1958 | Yoshida | 317—238 |
| 3,024,140 | 3/1962 | Schmidlin | 317—238 |
| 3,056,073 | 9/1962 | Mead | 317—238 |
| 3,059,123 | 10/1962 | Dacey | 317—235 |
| 3,060,327 | 10/1962 | Pfann | 317—235 X |
| 3,106,489 | 10/1963 | Lepselter | 317—235 |
| 3,116,427 | 12/1963 | Giaever | 307—88.5 |
| 3,193,685 | 7/1965 | Burstein | 317—235 X |
| 3,204,159 | 8/1965 | Bramley et al. | 317—235 |
| 3,204,161 | 8/1965 | Witt | 317—235 |
| 3,250,967 | 5/1966 | Rose | 317—234 |

FOREIGN PATENTS 1,060,881 7/1959 Germany.

OTHER REFERENCES

IBM Technical Disclosure Bulletin, vol. 5, No. 10, March 1963, page 126.

JOHN W. HUCKERT, *Primary Examiner.*

JAMES D. KALLAM, *Examiner.*

A. M. LESNIAK, *Assistant Examiner.*